(12) United States Patent
Weitkamp et al.

(10) Patent No.: US 7,276,808 B2
(45) Date of Patent: Oct. 2, 2007

(54) TOWER FOR A WIND POWER STATION

(75) Inventors: Roland Weitkamp, Belm (DE); Uwe Hinz, Weddingstedt (DE); Stephan Schäfer, Hille (DE)

(73) Assignee: Repower Systems AG, Hamburg (DE)

( * ) Notice: Subject to any disclaimer, the term of this patent is extended or adjusted under 35 U.S.C. 154(b) by 85 days.

(21) Appl. No.: 10/569,164

(22) PCT Filed: Aug. 25, 2004

(86) PCT No.: PCT/EP2004/009486

§ 371 (c)(1),
(2), (4) Date: Feb. 22, 2006

(87) PCT Pub. No.: WO2005/021897

PCT Pub. Date: Mar. 10, 2005

(65) Prior Publication Data

US 2006/0267348 A1   Nov. 30, 2006

(30) Foreign Application Priority Data

Aug. 25, 2003 (DE) ................................ 103 39 438

(51) Int. Cl.
*F03D 11/04* (2006.01)
(52) U.S. Cl. ............................ 290/55; 290/44; 415/4.2
(58) Field of Classification Search .................. 290/43, 290/44, 54, 55; 415/4.2, 4.3
See application file for complete search history.

(56) References Cited

U.S. PATENT DOCUMENTS 2,705,061 A   3/1955 Getz
4,180,369 A * 12/1979 Ottosen .................... 415/208.1
4,291,233 A *  9/1981 Kirschbaum ................ 290/1 C
4,565,929 A *  1/1986 Baskin et al. ................. 290/44
6,157,088 A * 12/2000 Bendix ......................... 290/55
6,270,308 B1 *  8/2001 Groppel ...................... 415/4.3
6,979,170 B2 * 12/2005 Dery et al. ................... 415/4.2
7,168,251 B1 *  1/2007 Janssen ..................... 60/641.1
7,234,409 B2 *  6/2007 Hansen ........................ 114/258

FOREIGN PATENT DOCUMENTS

| BE | 451 404   | 8/1943  |
| DE | 736 454   | 6/1943  |
| DE | 94 06 809 | 6/1994  |
| DE | 198 02 210| 7/1999  |
| FR | 901 698   | 8/1945  |
| FR | 2 597 161 | 10/1987 |
| WO | 97/39240  | 10/1997 |

* cited by examiner

*Primary Examiner*—Nicholas Ponomarenko
(74) *Attorney, Agent, or Firm*—Rankin, Hill, Porter & Clark LLP

(57) ABSTRACT

Disclosed is a tower for a wind power station comprising a machine pod disposed on the tower and a rotor mounted on the machine pod so as to be rotatable about an essentially horizontal axis. Said rotor is provided with at least one blade. The tower is composed of a tubular upper section that is connected to a lower section which is embodied as a lattice tower in a transition zone. The lattice tower encompasses at least three corner posts. The upper tower section forms at least one sixth of the entire tower. The cross section of the lower tower section below the transition zone is greater than the cross section of the upper tower section while the transition zone is configured such that the cross section of the lower tower section is adjusted to the cross section of the upper tower section so as to optimize power flux.

34 Claims, 5 Drawing Sheets

TOWER FOR A WIND POWER STATION

BACKGROUND OF THE INVENTION

Modern wind-driven power-plants are predominantly designed to rest on tubular towers, in particular steel tube towers, because this design, termed shell design, is the simplest and most economical. Regarding large wind-driven power-plants having rotor diameters of more than 70 m and towers of heights in excess of 80 m, their output power being more than 1.5 megawatt, the critical engineering limitation is the required tower diameter at the tower base. Towers of diameters larger than 4.3 m can be transported only with difficulty because frequently the clearance underneath bridges would not allow going through the underpass. Moreover the total length and weight of such towers demands subdividing them into several tower sections that are bolted to each other by annular flanges. In addition to transportation costs, such large annular flange connection means entail considerable costs when very large wind-driven power-plants (3-5 Mw) are involved.

In view of the difficulties in transportation, concrete towers are used increasingly, being manufactured either at the erection site of the wind-driven power-plant or else consisting of smaller components that will be bonded and braced together. Both types of towers however entail higher manufacturing costs than tubular steel towers. As a result hybrids of steel pipes and concrete are sometimes built, of which the upper tower is as much as possible a steel pipe tower and only the lower tower segment, of which the diameter is too large for transportation, is made of concrete. However the transition zone between steel tower and concrete tower entails complex engineering and high costs.

Furthermore, lattice towers called power pylons up to 114 m high are already in use for large wind-driven power-plants up to 114 m high and allowing outputs up to 2 Mw. Besides the advantage of problem-free transportation, such towers however also have the critical drawback of a much larger horizontal expanse than a comparable steel tube or concrete tower, frequently raising the problem of the required safe distance between the rotor blade tip and the tower (blade clearance). If in the event of a storm, if the rotor blade were to be excessively bent out of shape, there would be danger of contact with the tower and dire consequences for the entire edifice.

On the other hand, the larger horizontal expanse of the lattice tower allows materials to be saved. This advantage is known in the construction industry and saves on total weight and hence lowers initial costs. On the other hand, this economic advantage is negated in general by the tower maintenance costs required over a service life of 20 years. Illustratively, the dynamically highly stressed towers of the wind-driven power-plants must be checked periodically, and such maintenance at the lofty heights of the lattice towers is dangerous, time-consuming, physically exhaustive and must be carried out by highly skilled specialists.

It is known from the German patent documents DE 736,454 and DE 198 02 210 A1 that the tower may comprise an upper and a lower segment, the lower one being a lattice tower and the upper one being tubular.

Such designs suffer from the drawbacks of requiring very demanding engineering work at the transition zone between the shell construction (tubular tower) and the framework construction (lattice tower). As regards extant lattice towers for wind-driven power-plants, in general only a tubular stub, the so-called "pot", hereafter "stub", will be inserted directly underneath the equipment nacelle to implement the transition to the equipment nacelle fitted with an annular flange. In such designs the transition is implemented in general by typically bolting four corner posts of the lattice tower by means of junction plates or the like directly and from the outside on the stub. This design works because the tower is directly underneath the nacelle and thereby experiences only relatively low bending forces. In such a design, substantially only the horizontal rotor thrust acting as a transverse force on the tower need be transmitted. Farther below, where the tower is primarily loaded by the rotor thrust bending torque generated by the leverage of the tower length, such a design becomes uneconomical.

BRIEF SUMMARY OF THE INVENTION

The objective of the present invention is to design a tower for large wind-driven power-plants in a manner to eliminate the drawbacks of the state of the art, in particular regarding transportability, economics, maintenance and blade clearance.

In a manner known in the state of the art, the tower is fitted with an upper tubular tower segment and with a lower tower segment which, being a lattice tower, is fitted with at least three corner posts. The two tower segments are joined to each other at a transition site, the dimensions of the upper tower segment being substantially smaller in the transition zone than the dimensions of the lower tower segment.

In the present invention, the upper tower segment constitutes at least one sixth of the entire tower. This feature offers the advantage that an advantageous standard design may be used in the upper tower region Furthermore, the torsion loads in the upper tower region are much higher because of its lesser cross-section than in the lower tower segment. Because a tubular tower exhibits high resistance to torsion, the torsion forces can be absorbed better, for instance using a lattice tower.

As already mentioned above, the transition zone from the lower tower segment to the upper one is problematical. The reason is that the forces must be transmitted from the tubular cross-section of the upper tower segment to the three or illustratively also four corner posts of the lower tower segment. The simplest solution would be, for instance, a plate to which the upper and lower tower segments would be affixed. However, such a plate would have the drawback of perforce being very large to withstand such forces and thus would also be commensurately expensive.

While the present invention also provides that the lower tower segment cross-section underneath the transition zone be larger than that of the upper tower segment, on the other hand, it does design the transition zone in a manner to optimally match the cross-section of the lower tower segment to that of the upper segment as regards the distribution of forces. In this manner, the present invention offers the advantage of a transition zone where the force distribution passing from the upper tower segment to the lower one is optimized and that thereby the need to oversize the entire transition zone has been eliminated.

The synergy of the above features of the invention leads to an optimally designed tower. In its upper segment, the tower of the present invention is a standard tower. As regards the lower tower segment, which for instance because of its dimensions no longer can be designed as a tubular tower because of no longer being transportable, it will be a lattice tower. Using a lattice tower, moreover, offers a great advantage with respect to an offshore wind-driven power-plant, namely that its effective surface of wind incidence is less than that of a tubular tower. The advantageously matched transition zone leads to a lattice tower segment of which the corner posts and strut means are thinner, allowing reduction of the tower weight and related costs, which are a substantial part of the total cost of the wind-driven powerplant.

Relative to the tower axis, each corner post may subtend a slant selected in a manner that in a conceptual extension of said corner posts, their longitudinal axes will cross each other at a virtual intersection point. Advantageously, the tower of the present invention shall be configured in a way that the virtual intersection point of the corner posts shall be situated in a region, above the transition zone, that extends upwards or downwards from the nacelle by a third of the tower length because in that manner the corner posts are loaded only by perpendicular forces but not by bending.

In general, lattice towers are fitted with strut means between the corner posts to additionally withstand forces. By configuring the intersection point in the upper region of the wind-driven power-plant, the invention channels the force distribution predominantly through the corner posts and consequently the force distribution in the strut means shall be at a lesser level. In this manner the applied loads to the strut means are advantageously minimized and, therefore, may be made more compact, so that again the welding seam volume at the leg connections is advantageously reduced (cost savings).

In one advantageous embodiment mode of the invention, the transition zone is configured in a way that the cross-section of the lower tower segment tapers toward the cross-section of the upper tower segment and that, in an especially advantageous manner, this taper shall run along a length corresponding at least to the lower tube radius.

In further advantageous embodiments of the present invention, the transition zone is constituted by a transition unit designed in a manner that the horizontal tower expanse in its lower segment shall be substantially larger than that in the upper segment. Actually, the substantial kinks so entailed do conflict with present building regulations because, especially as regards shell construction, any kind of kinks will result in increases in forces that weaken the supporting structure. However, by resorting to the steps defined in the dependent claims, these indisputable drawbacks of the two kinks in the design of the invention can be negated or the kinks may be avoided entirely in order to fully make use of the advantages of the design of the present invention.

Regarding the state of the art, such kinks arising in shell construction are known only in very small wind-driven power-plants wherein force optimizing has not yet been a substantive factor. Instead the emphasis in manufacture has been to exploit the possibility of simply and economically connecting tubes having diameters readily available on the market. Regarding such small equipment (less than 300 Kw output), extant short tubular towers were deposited by means of strongly conical adapters on tubular lower parts of larger diameters.

Regarding modern wind-driven power-plants with outputs larger than 1 Mw, only tubular towers susceptible to slight kinking (maximum: 5-8°) are economical in the state of the art, such kinking basically being located relatively close to and underneath the equipment nacelle. Such designs illustratively discussed in European patent document EP 0 821 161 are known as "doubly conical towers" mainly allowing use of a large affixation flange at the connection site to the equipment nacelle and they serve to match the natural component frequency to requirements.

In a further advantageous embodiment of the present invention, the transition between the upper and lower tower segments advantageously shall be situated (where called for directly) underneath that horizontal plane which is defined by the rotor blade tip when the rotor blade points vertically down. This design allows avoiding, in a simple manner, all known drawbacks of the state of the art.

The upper tower segment being tubular, the requirement of slenderness and previously unattained economy is met, furthermore simple maintenance with weather-sheltered ascent means and working space also are critical advantages at such a great height. The moment the size of the tubular tower reaches its transportation limits, a lattice tower is inserted in the lower tower segment underneath the plane of the blade tip. The lattice tower, on account of its considerably larger horizontal expanse, provides substantial savings in material and hence greater economy. The maintenance problem is less critical in the lower tower segment because the state of the art already makes available cherrypickers allowing the maintenance personnel to access in simple and comfortable manner the lower tower segment.

Another drawback of lattice towers, namely that icing in cold weather constitutes a substantial additional weight on account of the large surface of the lattice-work, is substantially reduced in the present invention in that said additional weight only acts on the lower tower segment which is much less critical statically and dynamically.

Accordingly the transition zone is configured at a distance from the rotor axis which may be from 1.0 to 1.6 fold and in particular 1.0 to 1.3 fold the rotor radius.

To allow transporting the transition unit, the upper region of the unit shall be designed in an especially advantageous manner whereby, during assembly of the wind-driven power-plant at the site of erection that the unit shall be affixed, preferably in a detachable manner, to the upper tower segment.

Again the lower region of the transition unit is advantageously designed to be connected by a preferably detachable affixation means to each corner post of the lattice tower.

In addition to the corner posts, several strut means also may be advantageously screwed onto the lower region of the transition unit.

As found empirically in steel tube/concrete hybrid towers, the flange connection to the tubular tower must be considered as being especially critical.

Accordingly, an especially advantageous embodiment mode of the present invention provides that the detachable connection between the upper region of the transition unit and the upper tower segment is fitted with a two-row screw flange situated preferably at the inside of the connection site and a matching T-flange configured at the upper tower segment.

Fitting said connection site with a large, double row flange, moreover, offers the advantage that the flange simultaneously acts as a buckling brace for the excessive forces deflected at the outer contour kink. In this manner, the excessive forces caused by buckling are partly but effectively reduced.

Advantageously, the lower region of the transition unit comprises connection sites for plate-junction affixation to the lattice tower's corner.

Because the upper tower applies a considerable additional weight on the lower lattice tower, the corner posts of the lattice tower are advantageously in the form of a hollow construction shape in order to prevent kinking caused by the loads from the tubular tower.

The transition unit design is further very advantageous in that the finished height of the transition unit remains within the admissible transportation height. As a rule, the maximum shipping height in Germany is 4.3 m because of the limited clearance under overpasses, though goods 5.5 m high may still be transported along selected routes.

If on account of size, the transportation of the transition unit in one piece should be impossible—as regards very large wind-driven power-plants (about 3-5 Mw output)—another embodiment of the present invention provides in an advantageous manner that the transition unit shall be built in at least two sub-units preferably detachably connected to each other at the connection site. Connection then may be carried out, for instance, advantageously by means of screw flanges or brackets, though welding together the sub-units at the site of erection also may be an economical solution when the connection sites are situated in low-load zones.

In this respect the transition unit may be sub-divided in an especially advantageous manner by a vertical partition plane into at least two sub-units. Subdivision into a number of sub-units corresponding to the number of lattice tower corner posts is especially economical for manufacture.

In another advantageous embodiment of the invention, sub-division of the transition unit shall be in at least one horizontal partition plane.

Regarding especially large wind-driven power-plants, both types of subdivision obviously may also be combined.

In one advantageous embodiment of the present invention making full use of the maximum admissible height of transportation, the design of the transition unit or of its sub-units is such that, by means of adapter elements mounted on the extant connection sites or on those especially designed for this embodiment, the unit can be transported on a low-loader trailer.

Depending on the size and weight of the transition unit or sub-units therefore, transportation of several transition units or sub-units connected to each other directly or indirectly (by adapter elements) also is provided-for on low loader trailers. Such a procedure illustratively offers the feasibility to screw together the sub-units of an excessively high two-part transition unit at the (half) annular flanges and then keep them prone in order to stay within the permissible transportation height on a low loader trailer.

The transition unit may be designed in an especially efficient manner in another embodiment of the invention by being fitted with a wall and being built as a shell.

In an especially advantageous manner, the basic shape of the transition unit substantially corresponds to a markedly conical tube of which the mean wall slant relative to the center axis is larger than the wall slant of the lower region of the lattice tower and/or than the slant of the upper region of the lattice tower corner posts.

In this respect the mean slant is defined as the angle subtended between the vertical (or also the center line) and a conceptual line from the maximum expanse in the upper region of the transit unit to the maximum horizontal expanse in the lower region.

In order to carry out in an especially advantageous manner the pronounced increase of horizontal tower expanse of the invention, the mean slant of the transition unit wall relative to the center axis should be at least 15, preferably more than 25°.

As regards the basic shape of the transition unit being a conical tube, arbitrary tube cross-sections may be used, namely triangular, square, highly polygonal (for instance 16 corners), and also circular cross-sections. The invention also explicitly includes conical tubes of which the cross-section varies with length.

An especially advantageous embodiment mode provides in this respect that the transition unit's cross-section shall smoothly change from being substantially circular in the upper region into a substantially polygonal cross-section, preferably triangular or square, in the lower region. "Circular" in this context also may denote being highly polygonal, for instance containing 16 corners.

If the connection to the tubular tower is implemented by an annular flange, this flange may smooth the transition for instance from a 16-corner transition unit to the circular tubular tower.

If at least the lower portion of the tubular tower is also polygonal, affixation can be carried out in a problem-free manner using junction plates. If the slants of the transition unit's side surfaces to the tubular tower wall vary, an additional buckling brace may be used as called for.

In an especially advantageous manner, savings in material and weight can be attained by fitting the transition unit wall with at least one clearance. By resorting to skillfully shaped clearances, the force distribution may be improved relative to the design devoid of clearances. This feature applies in particular to archway-shaped clearances running from corner posts to corner posts.

Further optimization of the force distribution is attained by rib-shaped or door-frame like bracing at the edges of the arch-shaped clearances.

Advantageously, horizontal supports are configured between the corner posts of the lattice tower in the lower region of the transition unit for the purpose of increasing the latter's rigidity, said supports joining to each other the adjacent corner posts and/or diagonally opposite corner posts.

These horizontal supports may be joined integrally to the transition unit or, in an especially advantageous manner, they may be affixed by the junction plate connection between the transition unit and the corner posts.

A further advantageous embodiment mode of the present invention increases the transition unit rigidity by a configuration of ribs in at least four corner posts to rigidify the connecting lines of diagonally opposite corner posts.

In an especially advantageous embodiment, the transition unit is made by casting.

The inherent shaping versatility of cast components allows, therefore, to avoid extreme forces at the kinks by providing gentle, rounded transitions.

An especially effective design, taking account of force distribution, calls for the transition unit's wall annulus to be convex when seen in vertical cross-section, this feature allowing especially gentle transition from the flange in the upper region to the corner posts in the lower region.

In particular, the slant of the connection sites in the transition unit's lower region should be designed in an especially advantageous manner so that it corresponds to the slant of the lattice tower's upper region corner posts.

Construction using cast components also is especially advantageous with multi-part transition components exhibiting vertical partition planes because illustrative 4 identical cast components can be assembled into one transition component (economy of large numbers). Casting materials used for the casting embodiment modes illustratively are steel casting materials or granulated graphite cast irons, for instance GGG40.3.

If only a few towers of the invention should be built, the transition unit design by welding will be especially advantageous because then the high costs of casting are avoided.

In the state of the art, the transition to the concrete pedestal frequently is also implemented by T-flanges and therefore a further advantageous embodiment of the present invention provides making available a modular construction sequence of towers using the hybridization concept of the present invention, whereby an extant tubular tower (for instance an 80 m tower for a 1.5 to 2.5 Mw machine) is deposited by means of the transition unit onto different lower portions (for instance 30, 50 and 70 m high) in the form of a lattice tower in order that, depending on site, total tower heights of 110, 130 and 150 m are attained. In this manner, even heretofore uneconomical inland sites may become available for economic wind power.

In a further advantageous embodiment of the present invention, the lower tower segment in the form of a lattice tower comprises several superposed floors where each floor always includes the corner posts and at least one bracing running diagonally between the corner posts.

In a further advantageous embodiment of the present invention, the slope of the diagonal strut means is identical at all floors and as a result of this identical identity, the connection points between the legs and the strut means are also made identical. This design offers the advantage that identical nodes may be used to connect the corner posts and the strut means. Tower design is advantageously optimized in this manner. Heretofore the corner posts and strut means were matched to each other at assembly and then were welded in an expensive manner.

Compared to welded junctions, cast junctions may be made significantly more compact and hence more economically. To attain sufficient strength, welded junctions must in general be designed so that the weld seams do not intersect. As a result, the junctions frequently must be stretched in the zone of the tube transitions, and this requirement does not arise in cast junctions. Both corner posts and diagonal struts, preferably standard tubular shapes, for instance used in pipeline construction, may be used between the junctions for further improvement in economy. Connection may take place by means of screw flanges or by welding.

Using identical junctions offers the advantage that they can be pre-fabricated and that the corner posts and strut means during tower assembly need only be inserted into the junctions and be welded or screwed tight. This feature is a substantial simplification in the work entailed during lattice tower erection. Furthermore, substantial savings are made on account of mass-producing identical junctions.

Especially as regards offshore power-plants comprising a lattice tower, additional tubes must be provided to lay the cables connecting to the electric grid. On account of the waves, such additional tubes present additional stressed surfaces in an offshore power-plant, entailing additional loads on the lattice tower. Accordingly, an advantageous embodiment of the present invention provides that, to secure reduced wave loading, the cables used to hook up the wind-driven power-plant to the external electric power supply be placed in the corner posts of the lattice tower segment. In a further advantageous design of the invention, cable protecting pipes are pre-positioned in the corner posts to receive said cables. Said protective pipes advantageously are made of plastic and allow pulling the cables through them once the tower has been erected and anchored on the sea bottom.

Further features, advantage and details of the invention are disclosed in part by the description below and are partly made plain by it or result from the practical application of the invention. Two embodiment modes of the invention are described comprehensively. It is understood that other embodiment modes may be used and that alterations may be introduced without thereby transcending the scope of the present invention. Accordingly the following comprehensive description must not be construed narrowly, in particular details of both embodiment modes also may be interchanged at will.

DETAILED DESCRIPTION OF THE INVENTION

Figure 1:
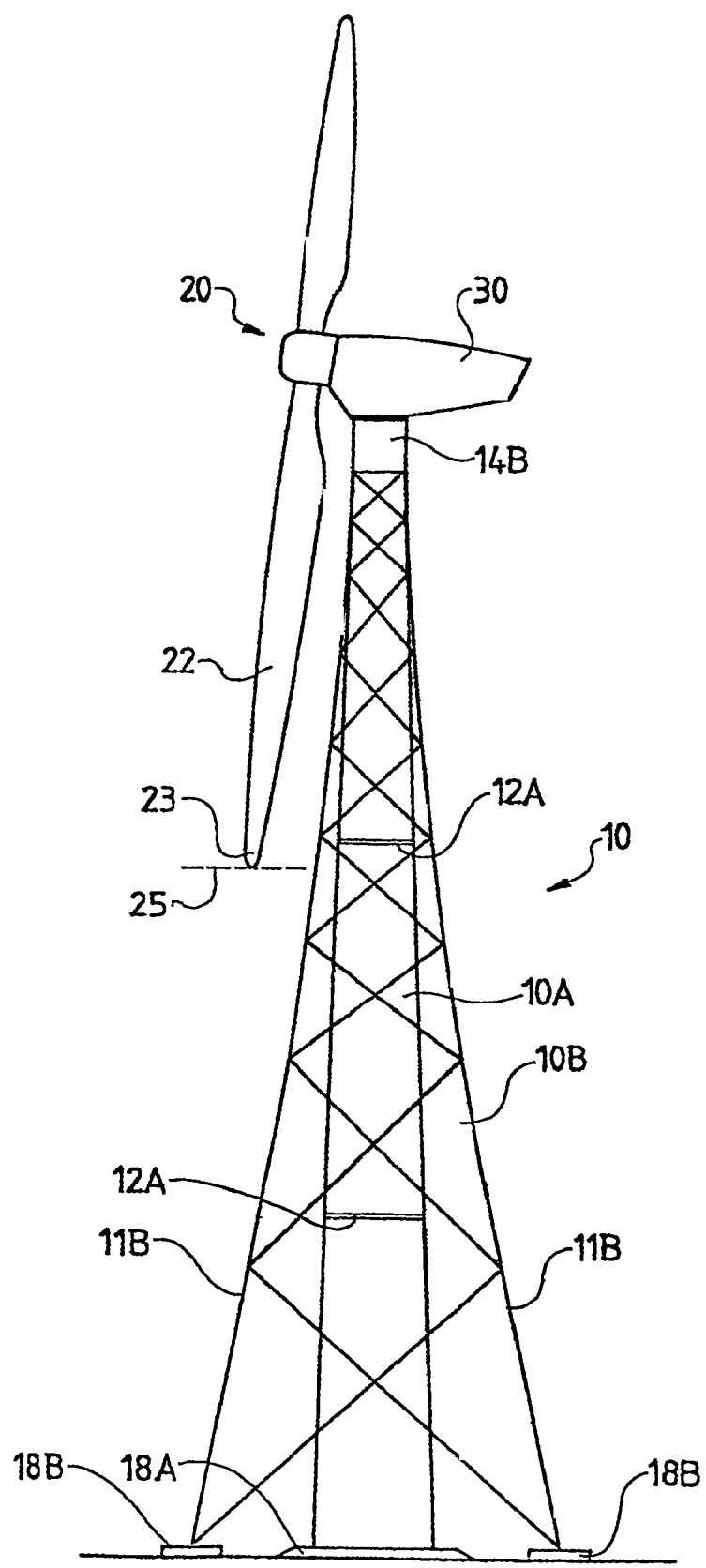
FIG. 1 shows a wind-driven power-plant of the state of the art.

FIG. 1 shows a wind-driven power-plant of the state of the art where the supporting tower 10 is made up of two superposed tower variations, namely a tubular tower 10A and a lattice tower 10B. The tower 10 bears an equipment nacelle 30 which is rotatable about the vertical tower axis and which supports a rotor 20 bearing at least one rotor blade 22 having a blade tip 23 and being rotatable about a substantially horizontal axis. This view shows a three-blade rotor, the horizontal plane of the rotor blade tip 23 in its lowermost position being denoted by a dashed line 25.

Besides the rotor bearing, the equipment nacelle 30 conventionally also contains a generator, a gear unit where called for, a wind tracking system, various electric components and further accessory systems. Such parts are omitted for the sake of clarity.

Because of transportation, the tubular tower 10A is fitted with several flange connections 12A. In the state of the art, these flange connections are unilateral, in general inward pointing annular flanges. In the state of the art, only the lowest flange is designed as a T flange (double row flange pointing inward and outward) as the transition means to the pedestal 18B.

In the embodiment variation of a lattice tower 10B, the transition to the annular flange of the equipment nacelle is conventionally implemented by a relatively short transition unit 14B called "pot", i.e. a "stub". The lattice tower in general rests by each corner posts 11B of individually built pedestals 18B.

The graphically superposed tower variations, namely the tubular tower 10A and the lattice tower 10B, show by means of the horizontal plane tangent to the lowest position of the rotor blade tip(s) 25 that the distance (blade clearance) between the blade and the tower is substantially smaller for the lattice tower 10B and hence much more critical than for the tubular tower 10A.

Figure 2:
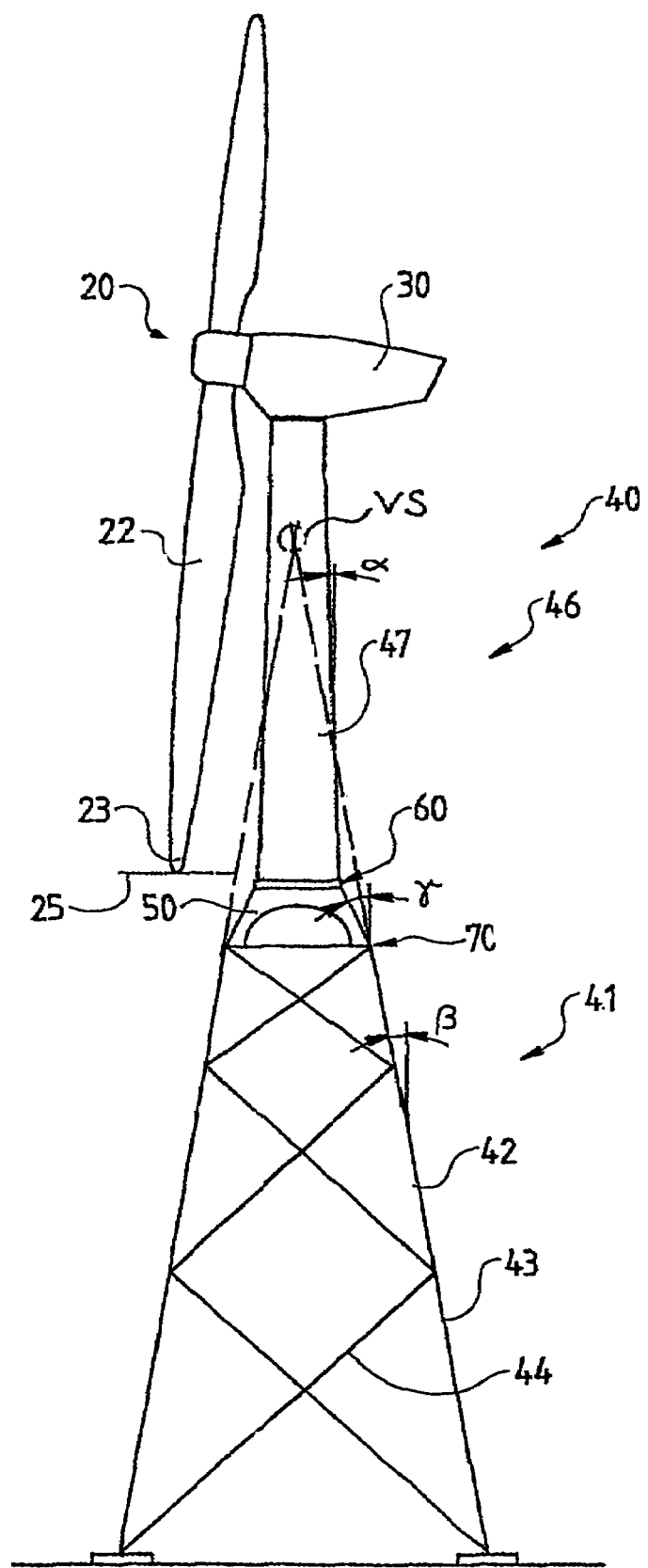
FIG. 2 is an overall view of the tower design of the present invention.

FIG. 2 is an overall view of a wind-driven power-plant where the tower design is that of the present invention. As in FIG. 1, the references 20 and 30 respectively denote the rotor and the equipment nacelle. In its lower segment 41, the tower 40 is a lattice tower 42 which, in the shown embodiment, is fitted with four corner posts 43 and a plurality of diagonal struts 44, and in the upper segment 46, the tower is a substantially tubular tower 47.

The connection of the lattice tower 42 to the tubular tower 47 takes place in a transition range designed in a manner that the lattice tower's cross-section is optimally matched with respect to force distribution in the tubular tower "Optimized force distribution" herein denotes a design which, either by means of a continuous change in geometry creates a gentle geometric transition between the various cross-sectional shapes of the upper and lower tower segments and hence averts force peaks in the transition zone, and/or, by means of suitable ribs and/or struts, shunts force peaks present in said transition range into the hookup construction. The assumption of a valid force distribution is vertical length—once the tower is erected—of said transition zone which is equal at least to the length of the radius of the lower tubular tower diameter and/or the use of supporting elements (shells, ribs, struts) which substantially connect the corner posts of the lower lattice tower to the upper tubular tower wall.

In the embodiment shown, the transition zone is configured in such a way that a transition unit 50 is mounted directly underneath the horizontal plane 25 of the rotor blade tip 23, said unit's horizontal expanse being considerably larger (more than 50%) in the lower region 70 than in the upper region 60.

The tubular wall slant of the upper tower segment 46 is slight in its lower region relative to the vertical and is denoted by $\alpha$. Similarly, the slant of the upper region of the corner posts 43 of the lattice tower 42 in the lower tower segment 41 is denoted by $\beta$.

In an optimal lattice tower segment, the corner posts 43 are at a slant selected in a manner that they intersect one another at a conceptual extension of these posts (shown in FIG. 2 by a dashed line) at a virtual intersection point VS. In the shown embodiment, the position of the virtual intersection point is configured in a region extending, as seen from the nacelle, a third of the tower length downward. Depending on the combination of transverse force and bending torque in the anticipated, size-determining load, the optimal virtual intersection point also may be located above the nacelle.

The mean slant $\gamma$ of the transition unit 50 is defined as the angle subtended between the vertical and a conceptual line from the maximum horizontal expanse in the upper region 60 to the maximum horizontal expanse in the in the lower region 70.

In the shown and especially advantageous embodiment of the invention, the angle $\gamma$ is substantially larger than the slant $\beta$ of the lower tower segment 41 and also than the slant $\alpha$ of the upper tower segment.

Conceivably too, the individual corner posts may be bent and thereby assume different slants from which a mean slant of the corner posts might be defined similarly to the case of the transition unit.

Figure 3:
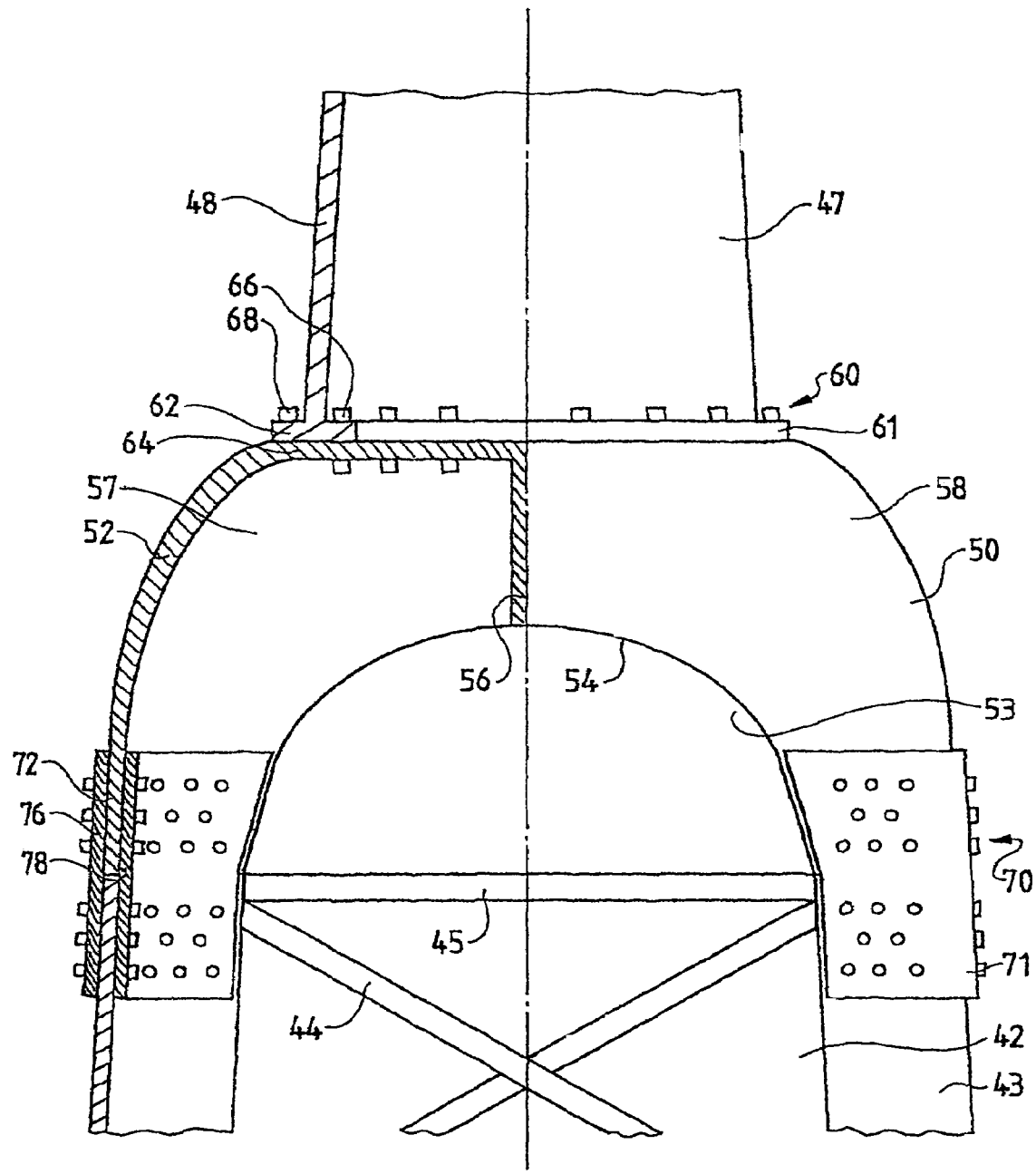
FIG. 3 shows a detailed view of one embodiment mode of the transition unit of the present invention.

FIG. 3 is a detailed view of a possible embodiment variation of the tower of the invention which comprises a cast, multi-part transition unit. A sideview is shown on the right of the line of symmetry, while the left portion of FIG. 3 is a vertical section. The lattice tower 42 is shown cropped and constitutes the lower tower segment, essentially consisting per se of four corner posts 43 and diagonal struts 44. The tubular tower 47, also shown cropped, and its walls 48 constitute the upper tower segment.

One embodiment mode of the transition unit 50 is in the form of a cast concrete shell with a wall 52 and arch-shaped clearances 53. In its upper region 60, the transition unit is connected by a flange connector 61 to the tubular tower 47 and, in its lower region 70, by four junction plates 71 to the corner posts 43 of the lattice 42.

In the upper region 60 of the transition unit 50, the wall 52 smoothly merges into an annular, two-row screw flange 64. The wall 48 of the tubular tower 47 is welded to a T flange 62 which, by means of an inner circle of screws 66 and an outer circle of screws 68, is screwed to the flange 64 of the transition unit 50. The inner set of screws 66 is a conventional steel construction feedthrough system, whereas the outer set of screws 68 of this embodiment mode is a blind hole screw system because in this manner the thickness distribution of the wall 52 of the transition unit 50 is especially advantageous for optimal force distribution. Obviously, the wall 52 of the transition unit 50 may be extended slightly further outward whereby the outer screw affixation system 68 also can be implemented as a feedthrough screw affixation system. In this case however, the transition unit 50 will be somewhat heavier and hence somewhat more expensive.

In the lower region 70 and at four connection sites 72, the wall 52 merges into the corner posts 43. The connection is implemented by a junction plate system 71 using an external plate 76 and an inner plate 78 that are screwed by a plurality of bolts to the connection site 72 and to the corner post 43. The slants of the connection site 72 and of the upper region of the corner post 43 being identical, planar plates can be used as the junction plates 76, 78.

Regarding reducing the number of parts, a further embodiment mode of the invention provides directly screwing the corner posts 43 to the connecting sites 72 of the transition unit 50. However, in this embodiment the force distribution from the corner post 43 into the wall 52 of the transition unit 50 is slightly less advantageous.

To rigidify the lower region 70 of the transition unit 50, horizontal supports 45 are affixed between the four corner posts 43. These posts may selectively connect the adjacent corner posts 43 or also the mutually opposite corner posts 43 and hence the diagonals of the lattice tower 42. Where called for, both designs may be used jointly in order to attain especially rigid and hence advantageous construction.

For the sake of simplicity, the connection between the diagonal struts 44 and the horizontal supports 45 to the plate junction 71 has been omitted. However such connections are adequately known in the state of the art, for instance when joining multi-part corner posts.

For an outer diameter of 4.3 m of the T-flange 62 of the tubular tower 47, the shown transition unit 50 subtends a transportation height also of 4.3 m, the lower transportation width being about 7 m. Such dimensions allowing only limited transportability, a preferred embodiment mode of the invention provides that the transition unit 50 be composed of several parts. For that purpose, the transition unit 50 is subdivided by a vertical partition plane into a left sub-unit 57 and a right sub-unit 58. The sub-units 57, 58 are joined to each other by screw flanges 56. As an alternative to the screw flange 56, an advantageous further embodiment of the invention uses plate junctions to connect the sub-units 57, 58 of the transition unit 50.

Said sub-division lowers transportation costs when the two-sub-units 57, 58 are laid flat up to a height of transportation of about 3.5 m at a width of about 4.3 m so that transportation, within Germany at least, shall be problem-free.

An especially advantageous embodiment of the invention sub-divides the transition unit symmetrically to the center line into four sub-units, making it possible either to attain even lesser transportation dimensions or to transport easily even larger transition units. Where the transition units are substantially larger, the invention additionally sub-divides the transition unit about a horizontal plane.

The shown embodiment mode of the transition unit as a cast unit offers the advantage that the wall 52 can be fitted in problem-free manner with a variable thickness, enabling very effective use of material. The highly loaded regions, such as the convex transition to the annular flange 64, or the connection site 72 in the form of a plate junction 71 to the corner post 43 of the lattice tower 42, may be provided with thicker walls than less-loaded regions. Also the boundary of the archshaped clearance 54 may be fitted for instance with a rigidifying rib. Cast construction furthermore allows optimal and smooth force distribution in the transition from the circular cross-section in the upper region 60 of the transition unit 50 to the illustratively shown square cross-section in the lower region 70 of the transition unit 50.

Where the tower design of the present invention is applied offshore, the space available in the transition unit may be used advantageously and efficiently to receive for instance electrical drive means (converters, switching equipment, transformer), a spare parts storage bin, optionally a small workshop) or as an emergency shelter for maintenance personnel or even a visitor room. For that purpose the present support structure may be completed by means of additional walls into a closed space which obviously would be fitted with the required emergency access/exit facilities and where called for with windows and climate control means. Regarding configuring the electric drive means within the transition unit, an especially advantageous embodiment of the invention installs them in the transition unit already at the manufacturing plant, and tests them there, and transports the transition unit together with the integrated means as a so-called power module and then to the erection site.

Figure 4:
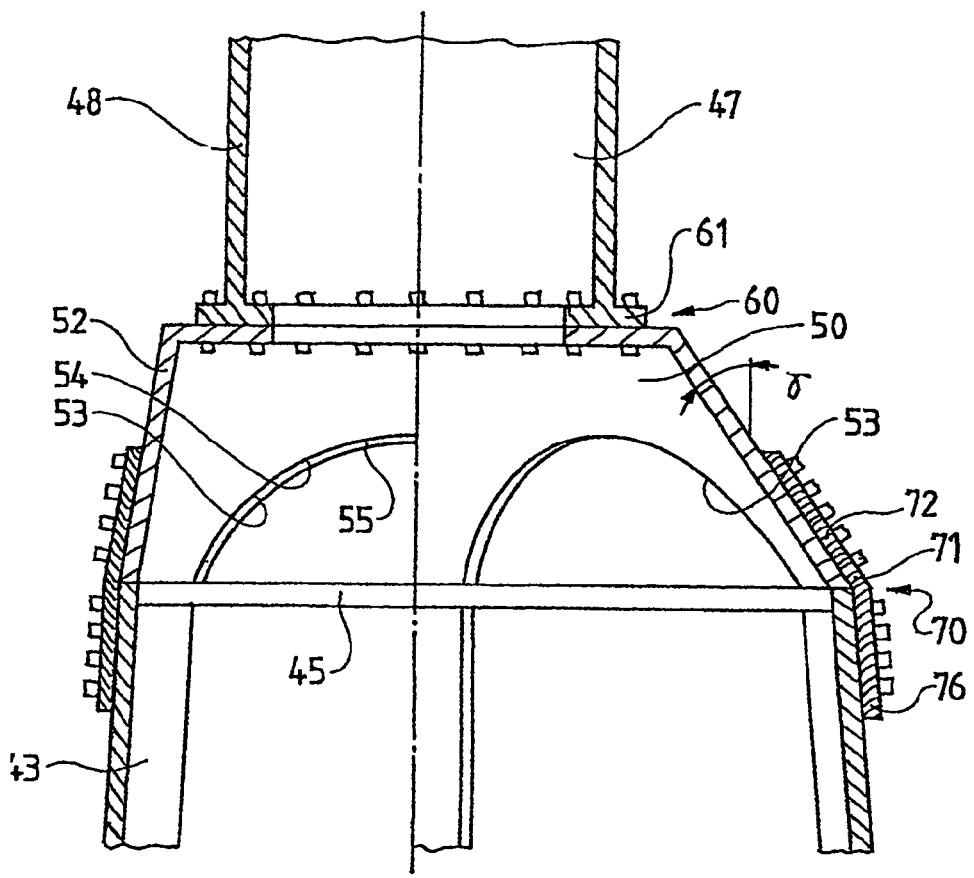
FIG. 4 is a detailed view of another embodiment mode of the transition unit of the invention.
Figure 4:
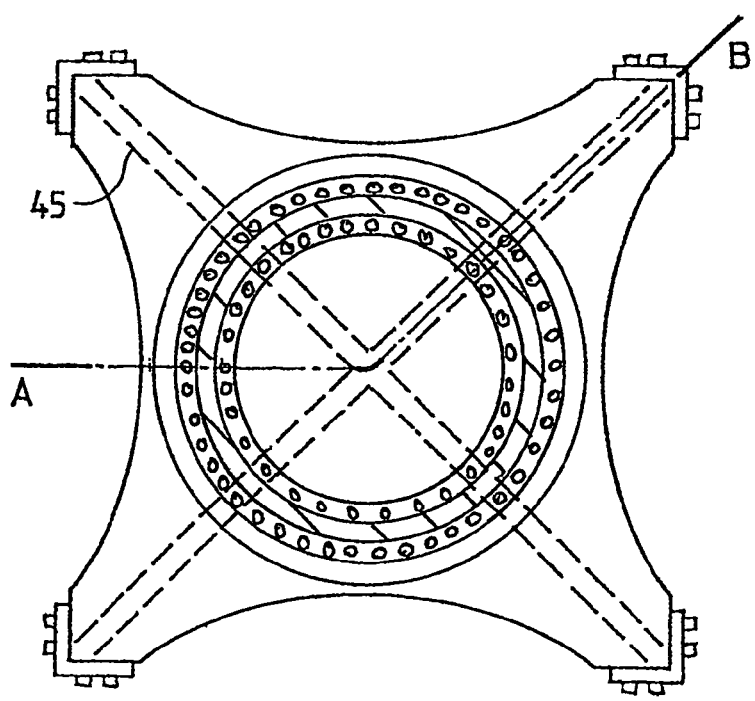

FIG. 4 is a detailed view of a further embodiment of the transition unit of the invention which in this instance is manufactured by welding. The lower drawing of FIG. 4 is a top view of the transition unit 50 and the upper drawing shows a vertical cross-section of the transition unit along the line A-B.

The basic design being very similar to that of FIG. 3, already discussed comprehensively above, essentially only differences will be discussed below.

The wall 52 of the transition unit 50 is a constant-thickness metal plate which is rolled inward in the upper region and which, in the lower region 70, is canted to the geometry of the corner posts 43.

The mean slant γ of the transition unit 50—defined as the angle subtended between the vertical and a conceptual line from the maximum horizontal expanse in the upper region 60 to the maximum horizontal expanse in the lower region 70—is substantially larger than the slant of the corner posts 43 of the lattice tower 42 and of course also larger than that of the tubular tower since latter is cylindrical in the shown embodiment.

Using a cylindrical tubular tower allows economical manufacture; it is possible solely because the lattice tower is made very rigid, whereby the overall structure can be made sufficiently rigid even when foregoing widening the tubular tower to increase rigidity. A cylindrical tubular tower is especially appropriate when the azimuth bearing the nacelle being rotatably mounted on the tower) is selected to be very large because this selection allows making the tubular tower very rigid without widening it.

In order to easily carry out the construction by welding, the junction plate 72 subtends in the lower region 70 of the transition unit 50 a slant that differs from that of the corner posts 43. As a result, the connection is implemented using junction plates 76 that are selected thick enough to absorb the forces arising from deflecting the applied loads. The bent junction parts may be thick metal-plate and, where called for, welded steel plate; however a further embodiment of the invention also uses cast metal junction plates.

Because said force deflection warps the junction plate connections inward (toward the tower axis), the invention provides thick horizontal supports 45 diagonally between every two mutually opposite corner posts 43. (For simplicity, the lower part of FIG. 4 only shows one such support 45 by dashed lines). In this manner, the deflection of the forces can be reliably controlled, the construction costs being substantially lower, though the weight is somewhat larger, than for cast constructions.

A further embodiment of the invention rigidifies the arch-shaped clearances 53 just as for the case of cast construction, this embodiment being implemented in an especially advantageous manner in the form of a weld-affixed strip 55 of metal plate (as for a door frame). This welding embodiment offers the advantage of lower manufacturing costs when producing only a few finished products, and simplifying monitoring/checking by official inspectors.

Figure 5:
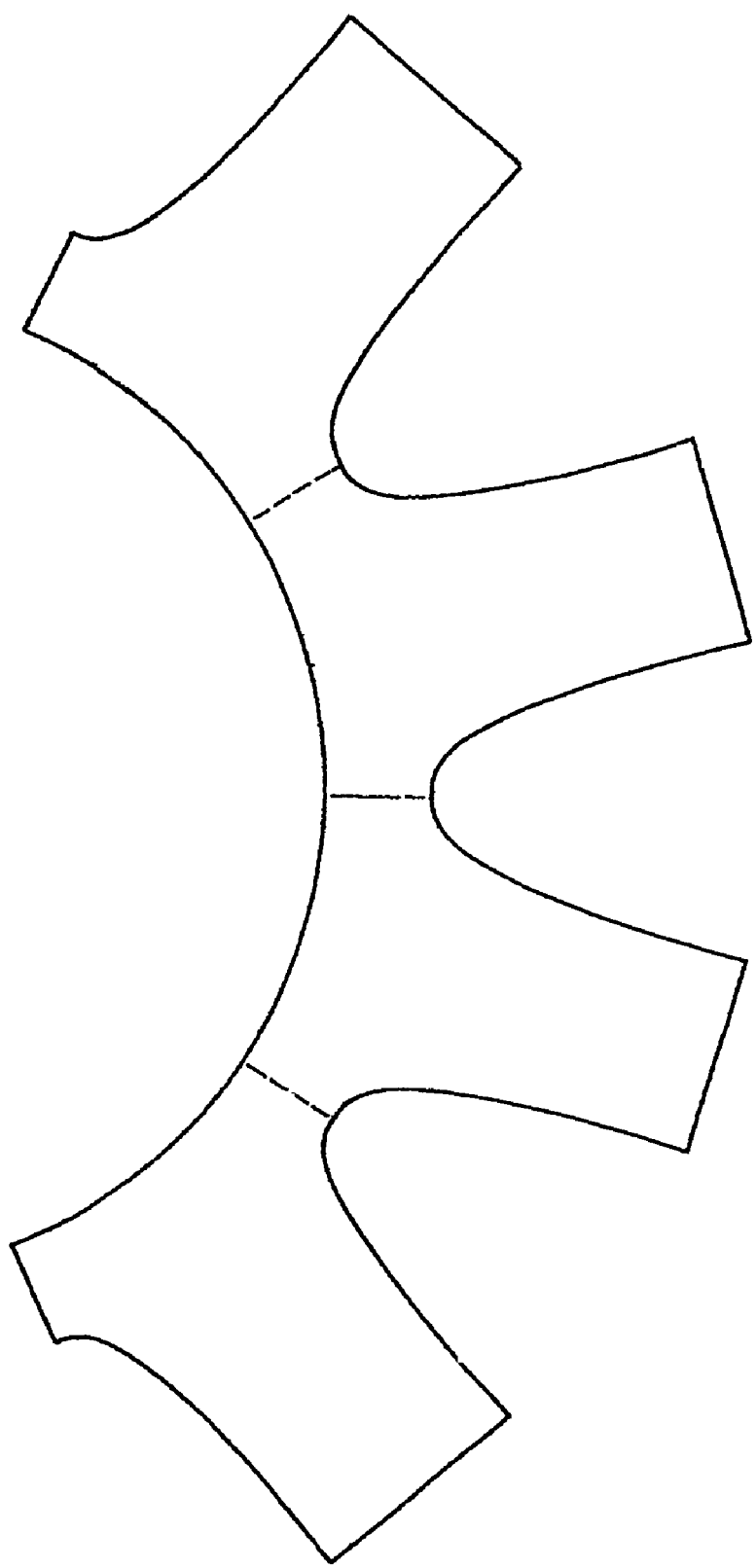
FIG. 5 is the geometric development of the wall of the transition unit of FIG. 4.

FIG. 5 is the geometric development of the transition unit of FIG. 4. The highly advantageous structural shape can be manufactured very simply from the baked metal plate as one piece or preferably, in the shown illustration of the lattice tower, in four pieces with four corner posts (indicated by dashed lines). The metal plate(s) are rolled conically for that purpose, additional edges being advantageous in the transition region to the corner posts to assure good transition to these posts. If sufficiently large rolling equipment is unavailable, the essentially circular shape at the transition to the upper flange also may be fashioned by a plurality of smaller edges.

The invention claimed is:

1. A tower (40) to support a wind-driven power-plant comprising an equipment nacelle (30) affixed to the tower (40) and a rotor (20) resting on the equipment nacelle in a manner to be rotatable about a substantially horizontal axis, said rotor being fitted with at least one rotor blade (22), said tower comprising an upper, tubular tower segment (46) which is connected in a transition zone to a lower tower segment (41) in the form of a lattice tower (42), said lattice tower comprising at least three corner posts (43) wherein the upper tower segment (46) constitutes at least one sixth of the entire tower, and wherein the cross-section of the lower tower segment (41) underneath the transition zone is larger than the cross-section of the upper tower segment (46), and in that the transition zone is designed in a manner that the cross-section of the lower tower segment is matched in a force-optimized manner to the cross-section of the upper tower segment.

2. The wind-driven power-plant tower (40) as claimed in claim 1, wherein the vertical expanse of the transition zone is at least half the upper tower segment's diameter in the transition zone or immediately adjoining it.

3. The wind-driven power-plant tower (40) as claimed in claim 2 wherein the transition zone tapers upward from the cross-section of the lower tower segment (41) as far as the cross-section of the upper tower segment (46).

4. The wind-driven power-plant tower (40) as claimed in claim 1, wherein the transition zone is constituted by a transition unit (50) comprising a lower region (70) connectable to the lower tower segment (41) and an upper region (60) connectable to the upper tower segment (46).

5. The wind-driven power-plant tower (40) as claimed in claim 4, wherein the transition unit's lower region (70) is designed in a manner that its largest horizontal expanse is 50 % -larger than its horizontal expanse in the upper region (60).

6. The wind-driven power-plant tower (40) as claimed in claim 4, wherein the tower (40) is designed in a manner that the transition unit (50) is configured underneath a horizontal plane (25) defined by a blade tip (23) when the rotor blade (22) is down in the vertical.

7. The wind-driven power-plant tower (40) as claimed in claim 4, wherein the upper region (60) of the transition unit (50) is designed in a manner that the transition unit (50) is connected by a detachable connection means (61) to the upper tower segment (46).

8. The wind-driven power-plant tower (40) as claimed in claim 4, wherein the lower region (70) of the transition unit (50) is designed in a manner that the transition unit (50) can be connected with each corner post (43) of the lattice tower (42) by means of a detachable connection means (71).

9. The wind-driven power-plant tower (40) as claimed in claim 7, wherein the detachable connection means (61) between the upper region (60) of the transition unit (50) and the upper tower segment (46) comprises a two-row screw flange (64) mounted on the transition unit (50) as the connection site and a T-flange (62) mounted on the upper tower segment (46).

10. The wind-driven power-plant tower (40) as claimed in claim 4, wherein the lower region (70) of the transition unit (50) comprises connection sites (72) for plate junctions (71) to the corner posts (43) of the lattice tower (42).

11. The wind-driven power-plant tower (40) as claimed in claim 4, wherein a built height of the transition unit (50) is limited by the overpass height beneath bridges and is between 4 and 5.5 m.

12. The wind-driven power-plant tower (40) as claimed in claim 4, wherein the transition unit (50) consists of at least two sub-units (57, 58) preferably detachably connected to each other at a connection site 56.

13. The wind-driven power-plant tower (40) as claimed in claim 12, wherein the transition unit (50) comprises at least one vertical partition plane.

14. The wind-driven power-plant (40) as claimed in claim 12, wherein the transition unit (50) comprises at least one horizontal partition plane.

15. The wind-driven power-plant tower (40) as claimed in claim 12, wherein the transition unit (50) or a sub-unit (57, 58) of the transition unit (50) is designed in a manner that, by means of adapter elements which are mounted on the extant connection sites (56, 64, 72) or on connection sites of their own for that purpose, said unit or sub-unit can be transported on a low-loader trailer.

16. The wind-driven power-plant tower (40) as claimed in claim 12, wherein the transition unit (50) or the sub-units (57, 58) of the transition unit (50) is/are designed in a manner that the transportation of several transition unit(s) (50) or transition sub-units (57, 58) connected directly or indirectly to each other can be carried out by a low-loader trailer.

17. The wind-driven power-plant tower (40) as claimed in claim 4, wherein the transition unit (50) comprises a wall (52) and is made in the shell mode of construction.

18. The wind-driven power-plant tower (40) as claimed in claim 10, wherein the basic shape of the transition unit (50) is substantially a markedly conical tube, the mean slant ($\gamma$) of the conical tube (52) relative to the center axis being larger than that ($\alpha$) of a wall (48) of the lower region of a tubular tower (47) and/or than the slant ($\beta$) of the upper region of the lattice tower corner posts (43).

19. The wind-driven power-plant tower (40) as claimed in claim 18, wherein the mean slant ($\gamma$) of the wall (52) of the transition unit (50) relative to the center axis is more than 25°.

20. The wind-driven power-plant tower (40) claimed in claim 4, wherein the transition unit (50) smoothly merges, from a substantially circular cross-section in the upper region (60), into a polygonal, preferably triangular or tetragonal cross-section in the lower region (70).

21. The wind-driven power-plant tower (40) as claimed in claim 18, wherein the wall (52) of the transition unit (50) is fitted with at least one clearance (53).

22. The wind-driven power-plant tower (40) as claimed in claim 21, wherein the minimum of one clearance (53) is archway-shaped and in that this archway-shaped clearance (53) runs from corner post (43) to corner post (43).

23. The wind-driven power-plant tower (40) as claimed in claim 22, wherein the minimum of one archway-shaped clearance is fitted with ribbed or archway-like rigidifying means (55).

24. The wind-driven power-plant (40) as claimed in claim 4, wherein horizontal supports (45) are configured in the lower region (70) of the transition unit (50) between the corner posts (43) of the lattice tower (42) and connect to each other the adjacent corner posts (43) and/or the (diagonally) opposite corner posts (43).

25. The wind-driven power-plant tower (40) as claimed in claim 4, wherein the lattice tower (42) comprises at least four corner posts (43) and the transition unit (50) is fitted with ribs bracing the lines of connection of mutually opposite corner posts (43) (diagonals).

26. The wind-driven power-plant as claimed in claim 4, wherein the transition unit (50) is a east sub-assembly.

27. The wind-driven power-plant tower (40) as claimed in claim 18, wherein the wall (52) of the transition unit (50) curves convexly when seen in vertical cross-section.

28. The wind-driven power-plant tower (40) as claimed in claim 27, wherein the slant of the connection sites (72) in the lower region (70) of the transition unit (50) corresponds to the slant of the upper region of the corner posts (43) of the lattice tower (42).

29. The wind-driven power-plant tower (40) as claimed in claim 4, wherein the transition unit (50) is a welded sub-assembly.

30. The wind-driven power-plant tower (40) as claimed in claim 1, wherein the tower segment (41) in the form of a lattice tower (42) comprises several superposed sections and that one section each time comprises the corner posts (43) and at least one strut means (44) runs diagonally between the corner posts.

31. The wind-driven power-plant tower (40) as claimed in claim 30, wherein the slope of the diagonal strut means is identical in all sections.

32. The wind-driven power-plant tower (40) as claimed in claim 1, wherein cables connecting said power-plant to an electrical grid run inside the corner posts (43) designed as hollow construction shapes.

33. The wind-driven power-plant tower as claimed in claim 32, wherein cable-protecting pipes receiving the cables run inside the corner posts (43).

34. The wind-driven power-plant tower as claimed in claim 1, in the form of an upper, substantially tubular tower segment and of various lower tower segments in the form of a lattice tower, wherein the total tower height is variable by selecting different lattice tower heights.

* * * * *

UNITED STATES PATENT AND TRADEMARK OFFICE
CERTIFICATE OF CORRECTION

PATENT NO. : 7,276,808 B2 Page 1 of 1
APPLICATION NO. : 10/569164
DATED : October 2, 2007
INVENTOR(S) : Weitkamp et al.

It is certified that error appears in the above-identified patent and that said Letters Patent is hereby corrected as shown below:

Column 14, Line 33 (Claim 26, Line 2), delete "east" and insert --cast--.

Signed and Sealed this

Thirteenth Day of May, 2008

JON W. DUDAS
*Director of the United States Patent and Trademark Office*